Feb. 18, 1964     A. A. MATTHIES     3,121,315
BIMETAL OPERATED POPPET VALVE
Filed Nov. 21, 1961     3 Sheets-Sheet 1

INVENTOR.
ALAN ARTHUR MATTHIES
BY
Bayard H. Michael
ATTORNEY

INVENTOR.
ALAN ARTHUR MATTHIES
BY
ATTORNEY

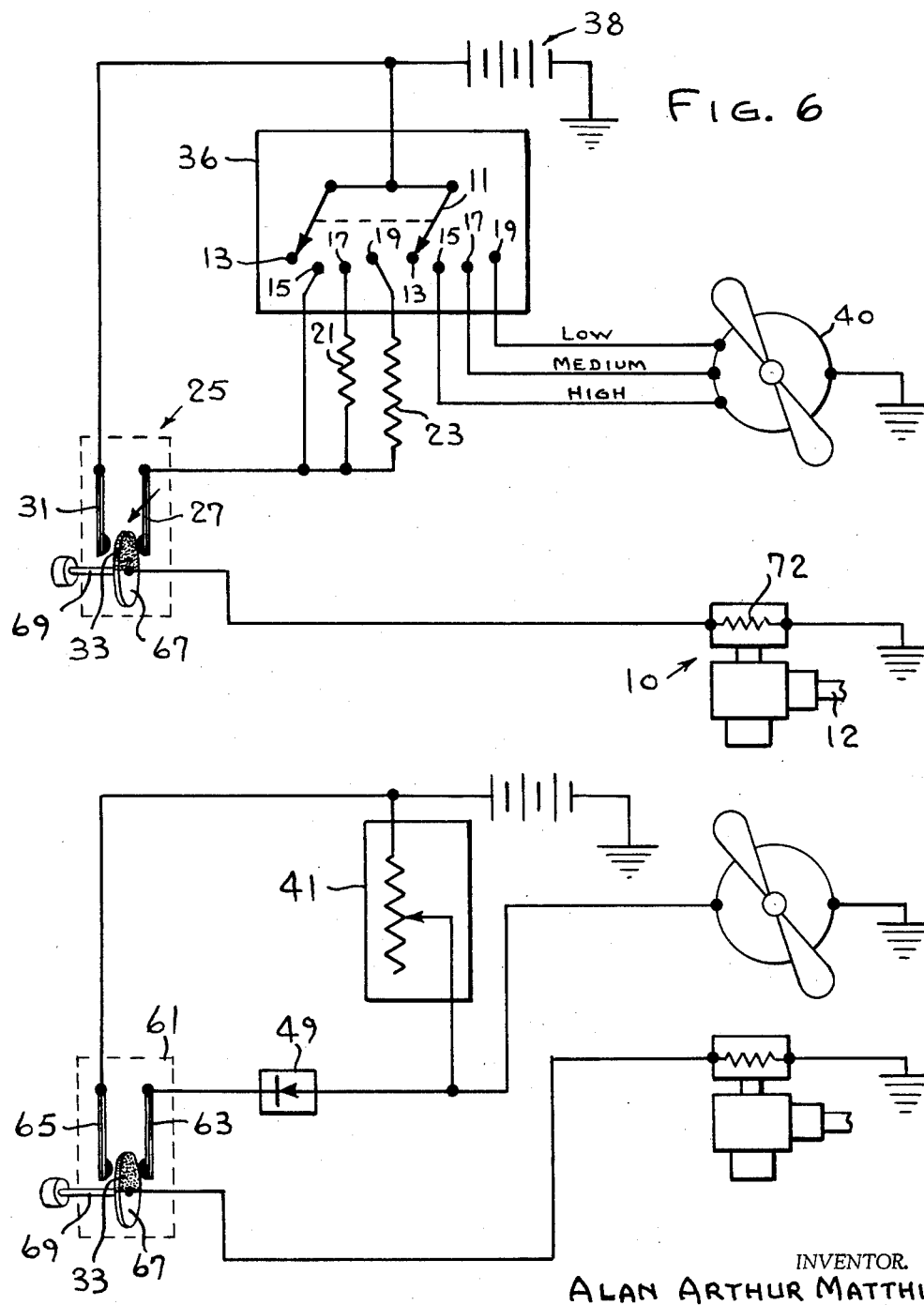

United States Patent Office 3,121,315
Patented Feb. 18, 1964

3,121,315
BIMETAL OPERATED POPPET VALVE
Alan Arthur Matthies, Milwaukee, Wis., assignor to Controls Company of America, Schiller Park, Ill., a corporation of Delaware
Filed Nov. 21, 1961, Ser. No. 154,015
25 Claims. (Cl. 62—180)

This invention relates to flow control systems and particularly to a thermoelectric valve and a control system therefor for controlling the operation of air conditioning systems for automobiles and the like.

Automotive air conditioning has presented some unique problems because of the limited space available for the system and the use of the automobile engine as the driving source for the refrigeration compressor. This means that the compressor speed and the capacity of the system vary with engine speed and without special controls the output of the system could not be regulated. At high speed the system would have too much capacity and the space would be cooled to an uncomfortably low temperature while under prolonged idling speeds the system would not be able to hold the temperature at the selected level. Under the former conditions, over-capacity or evaporator freeze-up may occur while under the latter conditions excessive head pressures may be encountered. Thermostatic expansion valves have reduced the excessive head pressure problem.

The present invention is concerned primarily with the provision of a control system and regulator valve which provides complete control of the capacity of the system at all engine speeds. There have been several approaches to this problem in the past, the most common of which is to control the engagement and disengagement of the clutch driving the compressor by means of a thermostat, adjustable or fixed, located either in the discharge air stream or on the evaporator fins. The chief objections to this type of control is the tremendous shock produced in the system whenever the compressor is turned on since it operates immediately at full capacity and also the wear and tear on the compressor belts due to the high load on the compressor. Considerable change in discharge air temperatures is common with these systems due to the temperature differential needed to actuate most thermostatic controls. Another approach to this problem is to bypass hot gas from the condenser directly into the evaporator and thus elevating the evaporator temperature. This system requires additional piping and accurate valve control to prevent leakage of hot gas into the evaporator.

In accordance with this invention I propose to provide a simple, quiet, slow acting electrically operated valve in the compressor suction line to be modulated between open and closed positions.

One of the principal objects of the invention is to provide an improved automotive air conditioning system and particularly a means for automatically controlling the capacity of the system.

Another object of this invention is to provide an improved electrically controlled valve for modulating the operation of such systems.

Another object of the present invention is to provide an improved electrically operated flow control valve having a miniaturized operator for moving a relatively large diameter valve against substantial pressure differentials with a small power consumption.

A further object is to provide a control system for an air conditioning system which is simple in design, smooth in operation, and prevents cooling system shock and rapid pressure changes.

A still further object is to provide a control system for an air conditioning system which makes evaporator freeze-up virtually impossible.

Another object of the present invention is to provide a control system for an automotive air conditioning system which will provide a substantially constant preselected discharge air temperature for any load or engine speed.

These objects are accomplished by positioning a thermoelectrically operated flow control device in the suction line of a compressor to modulate the flow of refrigerant to the compressor. The valve is operated by controlling the power to a bimetal heater located next to a stack of bimetals which are inherently slow acting and are capable of directly controlling the valve opening thereby modulating the evaporator pressure and temperature with respect to the power input to the bimetal heater. The bimetal heater is energized according to the speed of the evaporator fan so that the greatest power is supplied to the heater at the highest fan speed and the lowest power at the lowest fan speed. It can be readily seen that when an operator selects a low fan speed he automatically reduces the refrigeration capacity and raises the discharge air temperature at the same time. Thermostatic control may be added to this system to sense the discharge air temperature and control the energizing and de-energizing of the heater for the bimetal valve operator. Temperature control can then be maintained between predetermined limits.

The use of a stack of bimetals as the valve operator has made it possible to reduce the size of the device so that it can be added to the system without any additional piping or any increase in the size of the piping. It is also possible to mount the flow control device within the inlet of the compressor housing since the bimetal operator requires practically no maintenance or repair.

Other objects and advantages will be pointed out in or be apparent from the specification and claims, as will obvious modifications of the two embodiments shown in the drawings, in which:

FIG. 6 is a schematic view of an automatic control system; and

FIG. 7 is a schematic view of a modified control system which provides infinite speed control.

Figure 1:
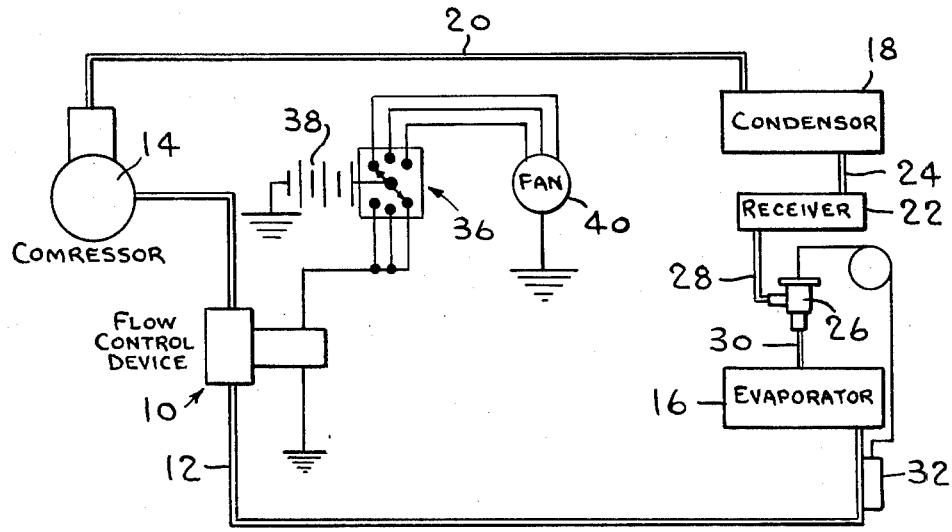
FIG. 1 is a schematic diagram of a refrigerating circuit incorporating the present flow control device.

Referring to FIG. 1 a refrigeration system is shown having a slow acting flow control device 10 positioned in suction line 12 between compressor 14 and evaporator 16. Condenser 18 is connected to the compressor by high pressure line 20 and to receiver 22 by line 24. Thermostatic expansion valve 26 is connected to the receiver by line 28 and to the evaporator by line 30. The expansion valve is controlled by thermostat 32 on the high temperature side of the evaporator. The flow control device is normally closed and is opened in response to the setting of manual selector switch 36 which closes the circuit to power source 38. The switch is also connected to evaporator fan 40 to simultaneously control both the flow in the suction line and the speed of the fan. It can be seen that in this system the compressor can be driven continuously by the car engine without any effect on the refrigeration system until the flow control valve is opened. The slow acting valve provides a gradual increase in load on the compressor thus eliminating the sudden increase in load on the engine as well as any shock to the system.

Figures 2, 3:
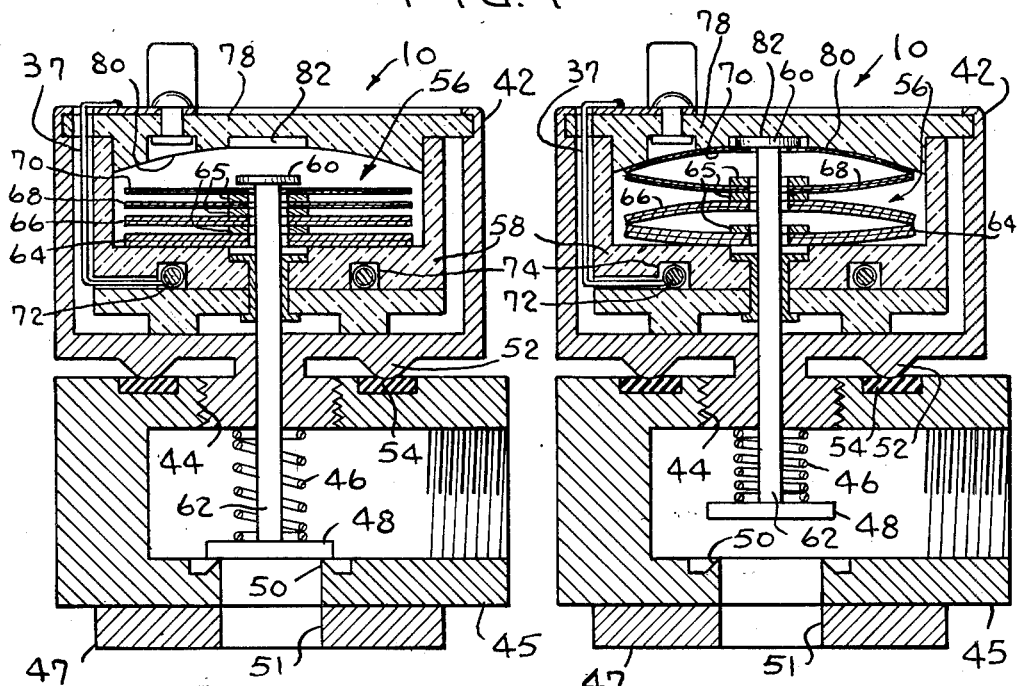
FIG. 2 is a sectional view of the flow control device with the valve closed.
FIG. 3 is a view similar to FIG. 2 with the valve open.
Figure 5:
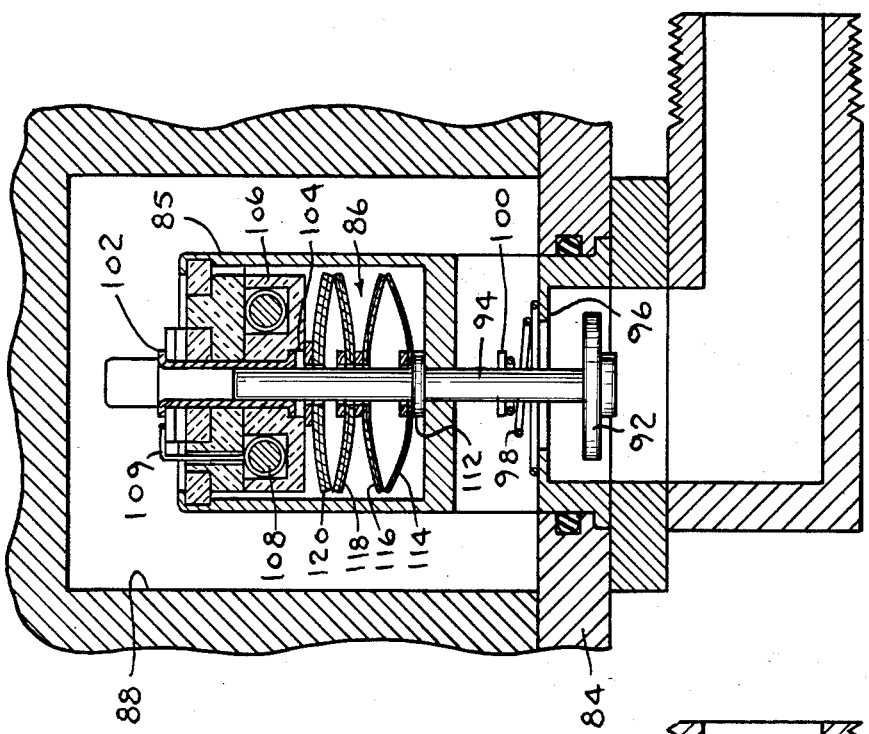
FIG. 5 is a sectional view similar to FIG. 4 with the valve open.

The slow acting flow control device shown in FIGS. 2 and 3 is designed to be positioned in the suction line external to the compressor by screwing housing 42 into threaded opening 44 in the suction line adaptor 45 which is positioned on flange 47 of the compressor. Spring 46 normally biases poppet valve 48 against valve seat 50 in the inlet 51 of the compressor. Annular flange 52 is seated on insulator 54 to insulate the housing from the suction line. The poppet valve is controlled by bimetal stack 56 which rests on heater enclosure 58 and acts against flange 60 on the end of valve stem 62. The bimetal stack includes a number of bimetal discs 64, 66, 68, and 70 of decreasing thickness separated by washers 65 with the thickest bimetal resting on the heater enclosure and the thinnest bimetal acting against flange 60. Bimetal heater 72 is positioned within groove 74 in the heater enclosure and is connected to switch 36 by lines 37 to heat the bimetals. The bimetals are arranged with the low expansion side of each disc next to the low expansion side of the adjacent disc and the high expansion side of each disc facing the high expansion side of an adjacent disc. When the heater is energized the bimetals will warp in opposite directions (FIG. 3) producing an increase in the axial length of the bimetal stack.

The poppet valve is biased closed by the spring but a greater force is exerted on the poppet valve by the pressure of the refrigerant in the suction line. The bimetal stack is designed to provide a decreasing force on the poppet valve as its distance from the valve seat increases since the force of the line pressure decreases as the valve opens. For clarification it should be noted that with a given change in temperature a bimetal's ability to produce force varies directly with the square of the bimetal thickness and its ability to deflect varies inversely with the bimetal thickness. Thus, a 0.0020 inch thick bimetal will deflect one-half as much as a 0.0010 inch thick bimetal but will produce four times as much force. The thickest bimetal is used to break the poppet valve off of the valve seat against the initial force of the pressure of the refrigerant in the system. Once the poppet valve has left the valve seat establishing refrigerant flow, however small, the system pressure will drop. The second bimetal disc in the stack now takes over. Since it has to work against slightly less pressure or poppet force its thickness can be reduced to provide greater motion while conserving expensive bimetal material. The still thinner third bimetal will now start its deflection since the system pressure has fallen due to the extra poppet stroke provided by the second bimetal and even a little extra by the first bimetal. This chain of action continues until the final thin bimetal disc which acts against relatively little force but creates the greatest deflection and, therefore, the greatest poppet movement. It becomes obvious that once the system pressure is established a set of bimetal discs can be sized or selected to exactly match the change in pressure for any given stroke of the poppet valve without adding any unnecessary bimetal material.

This bimetal stack arrangement provides a unique power element in that it supplies both high force and high deflection with a minimum amount of bimetal volume by matching the force deflection characteristics of the bimetal stack to the force created by the system pressure on the poppet valve throughout its stroke away from the valve seat. This use of the bimetal material to create both high force and high deflection as needed provides an efficient use of the material as well as reducing and minimizing the bimetal cost. The stacking of bimetal discs into a power element as described also creates a compact unit which is easy to heat efficiently with a minimum amount of heat losses.

The heater enclosure is secured with the housing by cover 78 which has a contoured inner surface 80 that engages the external surface of bimetal 70 when the poppet valve is fully open. The end of the valve stem will seat in recess 82 so that it will not interfere with the engagement of bimetal 70 with this surface. The cover is made from a high heat conducting material so that the heat in the bimetal discs will be dissipated quickly when the stack has been fully deflected preventing distortion from occurring in the discs through overheating.

The thin washer is placed between the bimetals to compensate for any initial distortion of the bimetals which might occur at high ambient temperatures. It is also virtually impossible to insure that all the bimetals will be dead flat with the poppet valve closed and seated. The washers eliminate any initial lost motion by insuring a solid column between the first moving thicker bimetals and poppet stem and, therefore, all of the deflection of the thicker bimetals results in poppet movement.

Another feature of the bimetal valve operator is its relative freedom from or resistance to chatter. Most poppet type valves have a tendency to chatter when the poppet valve nears the seat due to the high flow rate past the poppet valve. In this device when the poppet valve approaches the valve seat, its closing motion is controlled by the relatively thick bimetal disc which possesses an extremely high spring rate. The spring rate of this bimetal is so high that for all practical purposes the poppet could be considered supported by a solid member eliminating any chattering tendencies.

Figure 4:
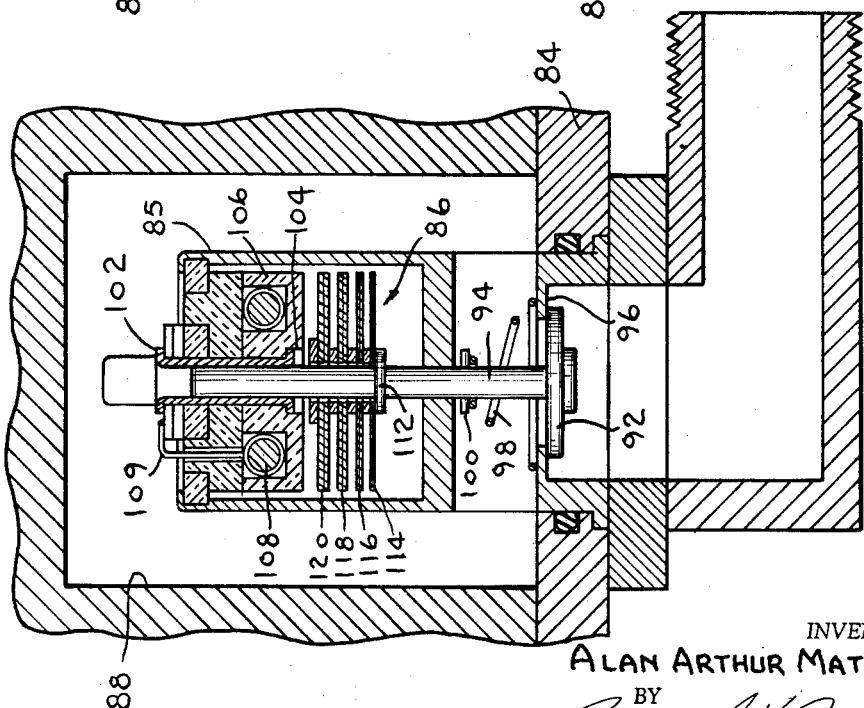
FIG. 4 is a sectional view of the control device located within the housing of a compressor.

In FIG. 4 a modified flow control device is shown which is mounted internally to the compressor. In this embodiment the flow control device still regulates suction line flow and has the ability to control or maintain any desired evaporator pressure. Housing 85 is mounted on the compressor valve plate 84 or outside wall of the compressor with bimetal stack 86 positioned in the inlet 88 of the compressor. Poppet valve 92 is mounted on the end of valve stem 94 and is biased into engagement with valve seat 96 by spring 98 acting against flange 100. The valve stem extends into bearing 102 in aperture 104 in heater enclosure 106. The heater enclosure is locked in the housing and supports bimetal heater 108 which is connected to the switch circuit by line 109. The bimetal stack is mounted on the valve stem and acts between the heater enclosure and flange 112 on the valve stem. The bimetal stack includes a number of bimetals 114, 116, 118 and 120 which act in the same manner as the bimetals described above.

It should be obvious that the location of the flow control device inside of the compressor reduces the actual cost of the control as well as being completely tamper proof. Because of its internal location it adds no external dimensions to the compressor and, therefore, saves valuable automotive underhood space. The housing may be contoured as described above to engage the end bimetal disc to dissipate heat and eliminate the possibility of distortion occurring as a result of overheating.

In both of the above flow control devices, the position of the poppet valve with respect to the valve seat is dependent on the extent to which the bimetal discs are warped. Since the deflection of these discs can be accurately controlled by the amount of heat radiated from the bimetal heater, a control system has been designed to provide accurate control of the current to the bimetal heater. Since the compressor is driven continuously from the automobile engine, the minimum flow rate through the valve is based on the engine idle speed. This will provide the preselected evaporator air discharge temperature for the poorest operating condition, thus assuring this temperature at all other operating conditions.

In FIG. 1 a simple electric control is shown which coordinates the speed of three speed D.C. fan motor 40 with the power input to the heater of the flow control device. Selector switch 36 includes a double pole multiple throw switch blade 11 that is movable from neutral contacts 13 into engagement with low temperature-high speed contacts 15, medium temperature-medium speed contacts 17 and high temperature-low speed contacts 19. The power input to the heater is limited by dropping resistors 21 and 23.

The selector switch is set by the passenger to the desired temperature indicia on the switch as in present systems but the fan speed and the power to the bimetal heater will be coordinated to provide the proper valve opening for the selected temperature. It, therefore, follows that maximum cooling is obtained with the valve fully open and the fan operating at high speed and lesser degrees of cooling are obtained with correspondingly smaller valve openings and lower fan speeds.

This control is relatively simple but it makes evaporator freeze-up virtually impossible since the evaporator pressure is varied with fan speed. There will be little effect on the system when fan speeds are changed because the slow action of the valve operator will gradually change evaporator pressure without any sudden change in load on the system as in earlier devices.

In FIG. 6 the control system of FIG. 1 has been modified to provide true thermostatic control by the addition of thermostat 25 which is normally placed in the discharge air stream of the evaporator to energize or de-energize the flow control device in response to the discharge air temperature by means of a bimetallic temperature sensing switch member 27 which can be set to open and close between predetermined temperature limits. By providing power interruption to the flow control device, the discharge air temperature can be precisely maintained in the desired temperature range. When bimetal member 27 opens, the heater will be de-energized and the valve will close slowly, raising the evaporator pressure and temperature and as a consequence, the discharge air temperature. The bimetal switch member will close when the temperature reaches the preset maximum limit to re-energize the flow control device and slowly reopening the valve to drop the evaporator pressure and temperature.

The dropping resistors are left in this system to automatically reduce the power input to the flow control device at lower fan speeds. In addition, they provide the added advantage of preventing thermal overshoot and undershoot of the discharge air. If full power were provided to the flow control device at low loads or at low fan speeds, its inherent slow acting tendency would allow considerable refrigeration to continue after thermostat satisfaction creating a thermal overshoot. The thermal overtravel and time lag tendency of the heat actuated flow control device is dependent upon the power input to it. It should also be noted that the temperature overshoot and undershoot of the discharge air is most critical and severe on light load days when slow or medium fan speeds would be in order and the suction line control is modulating near its close off point. The dropping resistors automatically reduce the power input to the flow control device at low or medium fan speeds greatly reducing and almost eliminating the tendency for this control to overshoot the discharge air temperature due to thermal overtravel.

A preheat circuit may also be provided in this system by adding a preheat bimetal switch member 31 which is connected directly to the power source shunting the dropping resistors and is positioned to sense ambient temperature. Full power is provided to the flow control device regardless of the selector switch setting whenever the ambient temperature reaches a predetermined maximum. In this system the bimetal is set to close at temperatures above 80° F. and to open at 75° F. This circuit automatically provides full power to the suction line control whenever the car temperature exceeds 80° F. Therefore, regardless of the position of the selector switch 36 and the thermostat bimetal switch member maximum power will be provided to the flow control device resulting in the maximum cooling capabilities of the refrigeration system until a discharge air temperature of 75° F. is reached, at which time the control system reverts to the control of bimetal switch member 27 and provides power to the flow control device as dictated by the position of the selector switch. The automotive passenger is, therefore, provided maximum cooling or minimum interior pull down time whenever the car interior temperature dictates that such action is necessary (above 80° F.) without having to change previous, and probably correct, control settings for the particular heat load that will be demanded after removal of the initial excess load. Any tendency for the slow acting bimetal valve to open slowly due to lack of power when fast response is in order is eliminated with this preheat circuit.

Preheat bimetallic switch member 31, as well as the thermostat bimetal switch member, provide a slow non-snap switch action. In the case of the thermostat switch member, this provides a temperature sensitive switch with little or no operating differential which greatly reduces still further any system temperature overshoot or undershoot tendencies as discussed earlier. A 5° F. open to close differential (or a differential as desired) can be obtained with the preheat bimetal switch member by selecting the correct bimetal material, from an electrical conductivity standpoint, and sizing it accordingly. Since this bimetal switch member is a current carrying member and is subjected to the full current load of the flow control device, it will heat slightly upon closing the circuit. This self-heating effect will create a lower opening temperature point than closing, providing this circuit with a convenient and desirable open to close differential. This also creates more positive switch action because, when closing and opening, the bimetal tension is either rapidly increased or decreased respectively, due to the self-heating effect. The self-heating effect is reduced or eliminated from the thermostat control switch member because an open to close differential in this switch is undesirable as discussed earlier. This can be done by selection and sizing of the bimetal material and/or by shunting the bimetal with a flexible current carrying bus as braided wire.

Thermostat 25 also provides an "off" position via switch contact 33 to completely break any circuit to the flow control device by making contact 33 movable between "on" and "off" positions. This circuit breaking action can be arranged to take place automatically when the selector switch is positioned in its "off" position such as winter shut down. An insulator block 67 is connected to the common contact and is rotated on shaft 69 between the bimetal switch members to prevent their closing on each other.

Referring to FIG. 7 a modified control system is shown in which the selector switch is replaced by rheostat 41 to control the speed of a single tap variable speed D.C. motor 43. The speed of the single tap motor is dependent on the voltage drop across the rheostat and consequently a greater range of speeds is available for the fan. The rheostat is also connected to the flow control device through thermostat 61 with diode 49 connected in the line between the rheostat and the thermostat. The thermostat is similar to the one described above and includes a thermostat bimetal control switch member 63 and a preheat bimetal switch member 65 both of which operate the same as described above. The diode is used to block current flow from the preheat bimetal switch member through common contact 33 and the thermostat bimetal when the preheat bimetal member closes to preheat the flow control device. If the diode is omitted the fan motor would operate at maximum speed whenever a preheat cycle is initiated.

These control systems in combination with the suction line flow control device are both capable of holding the evaporator air discharge temperature within predetermined limits regardless of engine speed. The use of bimetals for the switches provides a silent operating thermostat that can be accurately calibrated and requires very little service.

I claim:

1. A flow control device comprising,
a housing having an inlet and an outlet,
a passage in the housing connecting the inlet to the outlet and including an orifice,
valve means controlling the flow through the orifice, said valve means including a number of bimetal discs of decreasing thickness to provide an increasing operating force as the valve means closes the orifice,
and heating means for controlling the response characteristics of the bimetal discs in response to a predetermined condition to control the flow through the orifice.

2. A flow control device according to claim 1 wherein the thickness of the bimetal discs decreases as the distance of the discs from the heating means increases.

3. A flow control device according to claim 2 wherein the bimetal discs are arranged so that the low expansion side faces the low expansion side of an adjacent disc and the high expansion side faces the high expansion side of an adjacent disc.

4. A flow control device comprising,
a housing having an inlet and an outlet,
a passage connecting the inlet with the outlet and having a valve seat therein,
valve means movable from an open to a closed position with respect to the valve seat to control flow from the inlet to the outlet,
a number of bimetals connected to the valve means to move the valve means to the open position,
said bimetals having different thicknesses to vary their operating force with the position of the valve means,
and heater means positioned in the housing to heat the bimetals and move the valve means a predetermined distance from the valve seat in response to a control condition.

5. A flow control device according to claim 4 wherein the thickest of said bimetals is located closest to the heater means.

6. A flow control device according to claim 5 wherein said housing includes a surface contoured to engage the end bimetal throughout its full peripheral surface when fully deflected to dissipate the heat in the bimetals.

7. In an air conditioning system having a compressor, a condenser, and an evaporator, the combination of
valve means connected to control the flow of refrigerant from the evaporator to the compressor,
bimetal means connected to the valve means,
a heater positioned to heat the bimetal means to open the valve means,
means for energizing the heater,
and temperature responsive means connected to the heater and responsive to the discharge air temperature of the evaporator to control the energization of the heater.

8. The combination according to claim 7 wherein said bimetal means includes a number of bimetals of different thickness with the thickest bimetal located closest to the heater.

9. The combination according to claim 8 wherein the bimetals are so arranged that the low expansion sides of the bimetals are positioned opposite the low expansion side of an adjacent bimetal and the high expansion sides are positioned opposite the high expansion side of an adjacent bimetal.

10. The combination according to claim 9 wherein said bimetals are of the disc type.

11. In an air conditioning system having a compressor, a condenser, and an evaporator, the combination of
bimetal operated valve means positioned within said compressor to control the flow of refrigerant into the compressor, said bimetal operated valve means including a heater, electric circuit means connected to the heater and including a source of power and switch means responsive to predetermined control conditions to energize the heater, said bimetal operated valve means opening a predetermined distance in response to the amount of energization of the heater.

12. The combination according to claim 11 wherein said switch means includes a bimetal switch means responsive to the discharge air temperature of the evaporator to control the energization of the valve means.

13. A control system for an automotive air conditioning system including a compressor and an evaporator comprising,
valve means positioned to control the flow of refrigerant from the evaporator to the compressor,
evaporator fan means,
a source of power for the evaporator fan and the valve means,
and selector switch means simultaneously controlling the energizing of the valve means and the fan means to coordinate the evaporator temperature and pressure with the speed of the evaporator fan.

14. A control system according to claim 13 wherein said selector switch means comprises a variable resistance to vary the power to both the evaporator fan means and the valve means.

15. A control system according to claim 14 including a thermostatic switch means responsive to the discharge air temperature of the evaporator and connected to de-energize the valve means at a predetermined discharge air temperature.

16. A control system according to claim 15 including a second switch means connected to the valve means and responsive to ambient temperature and connected to shunt the selector switch means and the thermostatic switch means when the ambient reaches a predetermined maximum to pre-energize the valve means.

17. A control system according to claim 13 wherein said evaporator fan means includes a three speed motor and said selector switch means includes a double pole multiple throw switch means to vary the power to the thermoelectric valve means in relation to the speed of the fan motor.

18. A control system according to claim 17 including thermostatic switch means responsive to the air discharge temperature of the evaporator to de-energize the valve means at a predetermined air temperature.

19. A control system to control the flow of refrigerant in the low pressure line between the evaporator and compressor of an automotive air conditioning system comprising,
a valve means positioned in the low pressure line, said valve means being normally closed and being controllable to provide predetermined flow rates in the low pressure line,
switch means for controlling the energization of said valve means,
and a multiple speed evaporator fan,
said switch means being connected to control the speed of said fan in accordance with the opening of said valve means.

20. A control system according to claim 19 wherein said valve means includes a bimetal valve operator having a stack of bimetal discs positioned to warp in opposite directions in a substantially sequential manner.

21. A control system according to claim 21 wherein said bimetal discs are of different thicknesses with the thickest disc at one end of the stack and the thinnest at the other end of the stack.

22. A control system according to claim 21 including bimetal switch means positioned to respond to the air discharge temperature of the evaporator and connected to the valve means to de-energize the valve means when the discharge temperature reaches a predetermined minimum.

23. A control system according to claim 22 including a second bimetal switch means responsive to ambient temperature and connected to the valve means to shunt the first bimetal switch means when the ambient reaches a predetermined maximum to pre-energize the valve means.

24. A control system according to claim 23 wherein said first and second bimetal switch means operate through a common contact connected to the valve means and including a diode in the first bimetal switch means to prevent reverse flow of current through the first bimetal switch means.

25. A control system according to claim 21 including bimetal switch means responsive to ambient temperature and connected to the valve means to pre-energize the valve means when the ambient temperature reaches a predetermined limit.

References Cited in the file of this patent

UNITED STATES PATENTS

| | | |
|---|---|---|
| 1,219,516 | Whittelsey | Mar. 20, 1917 |
| 2,966,044 | Mitchell | Dec. 27, 1960 |